July 24, 1934.  S. G. DOWN  1,967,297
ANGLE COCK BUSHING
Filed Feb. 6, 1932
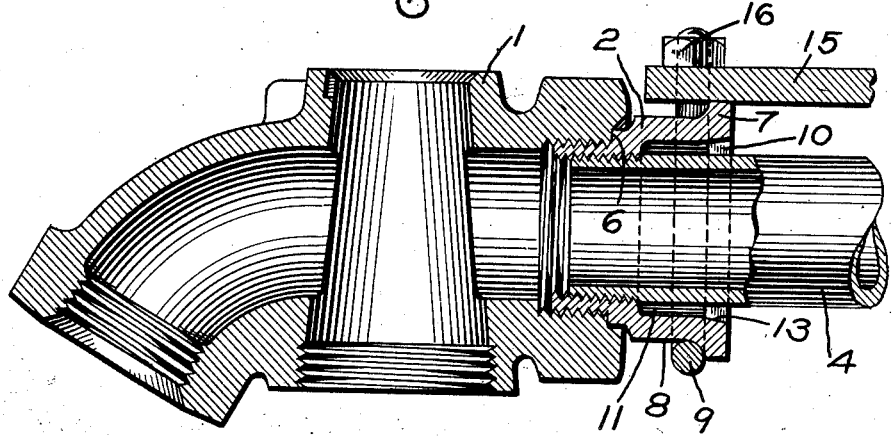
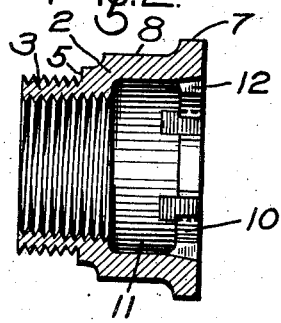 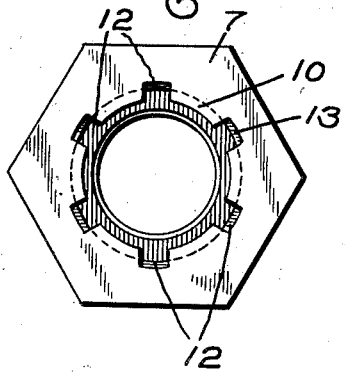
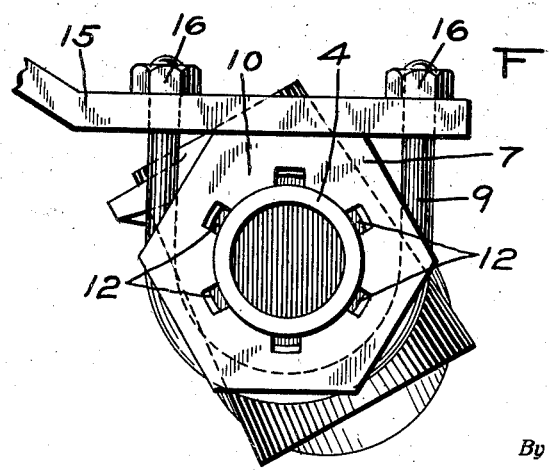
INVENTOR.
SIDNEY G. DOWN
By  *Wm. N. Cady*
ATTORNEY.

Patented July 24, 1934

1,967,297

UNITED STATES PATENT OFFICE 1,967,297

ANGLE COCK BUSHING

Sidney G. Down, Edgewood, Pa., assignor to The Westinghouse Air Brake Company, Wilmerding, Pa., a corporation of Pennsylvania Application February 6, 1932, Serial No. 591,437

3 Claims. (Cl. 285—13)

This invention relates to supporting means for an angle cock and the brake pipe associated therewith.

A type of angle cock now used on railroads is provided with an extension projecting from the threaded body of the angle cock, such that when the brake pipe is screwed into the threaded body, the extension, which loosely engages the pipe, acts as a support for the pipe, so as to relieve the threaded portion of the pipe of stress, due to forces acting on the angle cock.

The extension further provides a seat for a supporting stirrup, which is employed to hold the angle cock and the brake pipe in place on the car.

It has heretofore been proposed to provide a fitting, which may be applied to an angle cock of the old type, so as to secure the advantages of the new type of angle cock above referred to. With this fitting, after the fitting has been assembled with the angle cock, a drain port is drilled in the fitting, so positioned as to provide for draining liquid or foreign matter which may collect within the fitting.

This drainage port cannot be drilled in the fitting until after assembling, since a drain port drilled in the fitting before assembly would more often than not be so angularly positioned, after the fitting has been screwed home, that it could not act as a drain port.

The principal object of my invention is to provide an improved angle cock fitting of the above type, in which a drainage means is provided in the fitting such, that drainage will be effected regardless of the angular position of the fitting after the fitting has been screwed home in the angle cock, so that with the improved fitting, it is not necessary to perform the additional operation of drilling a drainage port, after the fitting has been assembled on the cock.

In the accompanying drawing; Fig. 1 is a sectional view of an assembly of an angle cock, brake pipe and supporting fitting embodying my invention; Fig. 2 a sectional view of my improved fitting; Fig. 3 an end view thereof; and Fig. 4 a rear end view of the assembly shown in Fig. 1.

In Fig. 1, the reference numeral 1 indicates the body of an angle cock of the old type, into which the improved fitting 2 is screwed.

The fitting 2 is provided with a nipple 3 having external threads adapted to be screwed into the angle cock and internal pipe threads adapted to receive the threaded end of a brake pipe 4. At the base of the nipple is provided a shoulder 5 adapted to seat against a machined face 6 of the angle cock. At the outer end of the fitting 2 is provided a flange 7 having hexagonal faces adapted to receive a wrench to screw the nipple in place.

Intermediate the flange 7 and the nipple 3 the fitting is provided with a cylindrical portion 8 adapted to provide a seat for a supporting stirrup in the form of a U bolt 9. An inwardly extending flange 10 is adapted to engage the pipe 4 and intermediate the flange 10 and the interior pipe threads is an annular clearance and drainage chamber 11.

In order to provide for the drainage of liquid from the chamber 11, the flange is provided with a plurality of drainage channels or notches 12 which are formed in the fitting when the fitting is cast, of sufficient number to ensure proper drainage from the chamber 11, whatever may be the angular position of the fitting after it has been screwed home in the angle cock. The bottom faces 13 of the channels are outwardly inclined from the chamber 11, so as to facilitate drainage.

The member 15 is a portion of a hanger bracket which is adapted to engage one of the faces of the hexagonal flange 7, as shown in Fig. 4. The member 15 is provided with openings through which the ends of the U bolt 9 extend, the nuts 16 having threaded engagement with the ends of the U bolt, being adapted to clamp the angle cock in place.

As shown in Figs. 1 and 4 of the drawing, the drainage channels or notches 12 in the fitting 2 are so arranged that, when one of the clamping faces of the hexagonal flange is in engagement with the member 15, one of the channels or notches 12 will be at the under side of the brake pipe 4, thus insuring drainage of liquid from the drainage chamber 11.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with an angle cock body, a brake pipe and a supporting bracket, of a bushing into which the brake pipe is threaded and which has screw-threaded engagement with the cock body, said bushing having an interior chamber open to the exterior of a portion of the brake pipe and having an opening leading from the chamber to the atmosphere to permit drainage from the chamber, a clamping face on said bushing adapted to engage said bracket to prevent rotation of the bushing, and means for clamping said bushing to said bracket, said opening being so located with respect to the clamping face that when the clamping face is in engagement with the bracket the opening will be at the under side of the brake pipe.

2. The combination with an angle cock body, a brake pipe and a supporting bracket, of a bushing into which the brake pipe is threaded and which has screw-threaded engagement with the cock body, said bushing having an interior chamber open to the exterior of a portion of the brake pipe and having a plurality of drainage openings leading from the chamber to the atmosphere, a plurality of clamping faces on said bushing any one of which is adapted to engage said bracket to prevent rotation of the bushing, and means for clamping said bushing to said bracket, said openings being so arranged with respect to the clamping faces that when one of the clamping faces is in engagement with the bracket one of said openings will be at the under side of the brake pipe.

3. The combination with an angle cock body, a brake pipe and a supporting bracket, of a bushing into which the brake pipe is threaded and which has screw-threaded engagement with the cock body, said bushing having an interior chamber open to the exterior of a portion of the brake pipe and having a plurality of drainage openings leading from the chamber to the atmosphere, a plurality of clamping faces on said bushing any one of which is adapted to engage said bracket to hold the bushing in a predetermined angular position, and means for clamping said bushing to the bracket, said openings being so arranged that when one of the clamping faces is in engagement with the bracket one of the openings will be at the under side of the brake pipe.

SIDNEY G. DOWN.